US006288875B1

(12) United States Patent
Budde

(10) Patent No.: US 6,288,875 B1
(45) Date of Patent: Sep. 11, 2001

(54) GIMBAL ASSEMBLY WITH CONTOURED GIMBAL ARMS FOR IMPROVED GIMBAL RESONANCE

(75) Inventor: Richard August Budde, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/043,326
(22) PCT Filed: Sep. 25, 1997
(86) PCT No.: PCT/US97/17228
§ 371 Date: Mar. 20, 1998
§ 102(e) Date: Mar. 20, 1998
(87) PCT Pub. No.: WO98/45841
PCT Pub. Date: Oct. 15, 1998

Related U.S. Application Data
(60) Provisional application No. 60/042,810, filed on Apr. 8, 1997.

(51) Int. Cl.[7] .................................................... G11B 5/48
(52) U.S. Cl. ........................................................ 360/245.3
(58) Field of Search ............................ 360/104; 369/244, 369/44.14, 44.15, 44.21; 359/819

(56) References Cited

U.S. PATENT DOCUMENTS

| 3,975,630 | 8/1976 | Zorn | 250/202 |
|---|---|---|---|
| 5,014,144 | 5/1991 | Sato et al. | 360/104 |
| 5,125,750 | 6/1992 | Corle et al. | 360/819 |
| 5,138,507 | 8/1992 | Zarouri et al. | 360/104 |
| 5,428,490 | 6/1995 | Hagen | 360/104 |
| 5,461,525 | 10/1995 | Christianson et al. | 360/104 |
| 5,491,597 | 2/1996 | Bennin et al. | 360/104 |
| 5,497,359 | 3/1996 | Mamin et al. | 369/44.15 |
| 5,504,731 | 4/1996 | Lee et al. | 369/112 |
| 5,638,234 | 6/1997 | Hagen | 360/104 |

FOREIGN PATENT DOCUMENTS 0 671 727 A1   9/1995   (EP) .

Primary Examiner—George J. Letscher
(74) Attorney, Agent, or Firm—Westman, Champlin & Kelly, P.A.

(57) ABSTRACT

A gimbal spring (38) for supporting a slider (20) relative to a disc (12) surface. The gimbal spring (38) includes opposed flexure arms (48,50) extending from a base of the gimbal spring (38). The flexure arms (48,50) are designed to support the slider (20) coupled to the gimbal spring (38) via a mounting tab (54) to pitch and roll relative to the disc (12) surface. The flexure arms (48,50) are formed of elongated members extending from the base to define a fixed end and an extended end. The flexure arms (48,50) include an intermediate portion between the fixed end and the extended end having a reduced mass, which is less than the fixed end and extended end. The reduced mass enhances the operation characteristics of the gimbal spring (38).

6 Claims, 4 Drawing Sheets

GIMBAL ASSEMBLY WITH CONTOURED GIMBAL ARMS FOR IMPROVED GIMBAL RESONANCE

CROSS-REFERENCE TO RELATED APPLICATION

This application claims priority to U.S. Provisional Application Ser. No. 60/042,810, filed Apr. 8, 1997, and entitled "AN IMPROVED SUSPENSION DESIGN FOR A OPTICAL HEAD GIMBAL ASSEMBLY."

BACKGROUND OF THE INVENTION

The present invention relates to a disc drive assembly. In particular, the present invention relates to an improved suspension design for supporting a head relative to a disc surface.

Disc drive systems are known which read data from a disc surface during operation of a disc drive. Such disc drive systems include conventional magnetic disc drives and optical disc drive systems. Optical disc drive systems operate by focusing a laser beam onto a disc surface via an optical assembly which is used to read data from the disc surface. Discs are rotated for operation of the disc drive via a spindle motor to position discs for reading data from or writing data to selected positions on the disc surface.

Known optical assemblies include an objective lens and a solid immersion lens (SIL) which is positioned between the objective lens and the disc surface. The SIL is positioned very close to the data surface of the disc and is described in U.S. Pat. No. 5,125,750 to C. Orle et al., which issued Jun. 30, 1992, and in U.S. Pat. No. 5,497,359 to Mamin et al., which issued Mar. 5, 1996. In these optical systems, a laser beam is focused onto the SIL using an objective lens. The SIL is preferably carried on a slider and the slider is positioned close to the disc surface. Use of an SIL increases storage density.

The slider is generally formed of a transparent material and includes an air bearing surface to fly the SIL above the disc surface. The slider includes a leading edge and a trailing edge. Rotation of discs creates a hydrodynamic lifting force under the leading edge of the slider to lift the leading edge of the slider to fly above the disc surface in a known manner. The slider preferably flies with a positive pitch angle in which the leading edge of the slider flies at a greater distance from the disc surface than the trailing edge.

The slider and SIL are supported above the disc surface via a suspension assembly which includes a load beam and gimbal spring 36. The slider is coupled to the load beam via the gimbal spring. The load beam applies a load force to the slider via a load button. The load button defines an axis about which the slider pitches and rolls via the gimbal spring. The slider is preferably resilient in the pitch and roll direction to enable the slider to follow the topography of the disc. Preferably, it is desired that the gimbal spring be rigid in the in-plane direction for retaining precise in-plane slider positioning.

The flexure of the gimbal spring permit the air bearing slider to pitch and roll as the slider flies above the disc surface. It is important to maintain the proximity of the SIL and slider relative to the disc surface to maintain the proper focus of light to the disc surface as is known for optical disc drive systems. It is important that the flexure system including the load beam and the gimbal spring be designed to stably and accurately support the SIL during operation of the disc drive system. Also in a magneto-optic (M-O) system, a magnetic transducer element is carried on the slider to write data to the disc surface. It is also important to accurately support and position the magnetic transducer elements relative to the disc surface during operation of the M-O system.

An actuator mechanism is coupled to the suspension assembly to locate the SIL relative to selected disc positions for operation of the disc system. During movement of the suspension system, force is transmitted through the load beam and gimbal spring to move the slider. Operation of the actuator mechanism, air bearing surface, and spindle motor introduce external vibration to the slider and suspension assembly. Depending upon the mass and stiffness of the suspension assembly, including the gimbal spring and load beam, external vibration may excite the load beam and gimbal spring at a resonant frequency, thus the input motion or external vibration may be amplified substantially, thus causing unstable fly characteristics and misalignment of the slider relative to the disc surface.

External vibration or excitation of the suspension assembly and slider may introduce varied motion to the slider and suspension assembly. Depending upon the nature and frequency of the excitation force, the slider and suspension assembly may cause torsional mode resonance, sway mode resonance, and bending mode resonance. Torsional mode motion relates to rotation or twisting of the suspension assembly about an in-plane axis. Bending mode resonance essentially relates to up/down motion of the suspension assembly relative to the disc surface. Sway mode vibration relates to in-plane lateral motion and twisting. It is important to limit resonance motion to assure stable fly characteristics for the SIL. In particular, it is important to control the torsion and sway mode resonance, since they produce a transverse motion of the slider, causing head misalignment.

The resonance frequency of the suspension assembly for torsion and sway mode resonance is related to the stiffness or elasticity and mass of the suspension system. Thus, it is desirable to design a suspension system which limits the effect of sway mode and torsion mode resonance in the operating frequencies of the disc drive while providing a suspension design which permits the slider to pitch and roll relative to the load button which has relatively high lateral rigidity and stiffness for maintaining precise in-plane positioning of the slider along the yaw axis.

SUMMARY OF THE INVENTION

The present invention relates to a gimbal spring for supporting a slider relative to a disc surface. The gimbal spring includes opposed flexure arms extending from a base of the gimbal spring. The flexure arms are designed to support the slider coupled to the gimbal spring via a mounting tab to pitch and roll relative to the disc surface. The flexure arms are formed of elongated members extending from the base to define a fixed end and an extended end. The flexure arms include a center portion between the fixed end and the extended end having a reduced mass than the fixed end and extended end.

This design provides improved mass and stiffness distribution so that there is sufficient stiffness at the ends of the flexure arms while providing more desirable resonance characteristics for the gimbal spring. The fixed end and extended end of the flexure arms are formed of sufficient thickness to provide sufficient in-plane stiffness for supporting the slider. In particular, the reduced mass center portion provides more desirable resonance characteristics for operation of the disc drive system and allows the slider to pitch and roll relative to the load point.

It should be understood that the drawings are for illustrative purposes and are not necessarily drawn to scale.

DETAILED DESCRIPTION OF THE PREFERRED EMBODIMENTS

Figure 1:
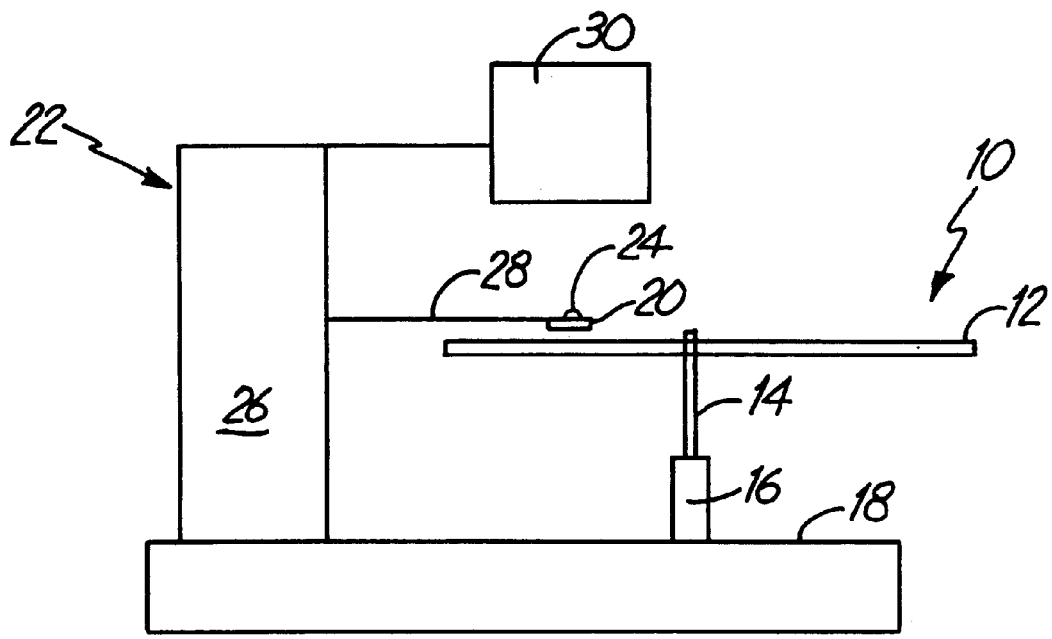
FIG. 1 is a schematic diagram illustrating operation of an optical storage system.

FIG. 1 is a simplified diagram illustrating an optical storage system using a solid immersion lens (SIL) in accordance with one embodiment of the present invention. Optical system 10 includes an optical disc 12 having a data surface which carries optically encoded information. Disc 12 rotates about spindle 14 and is driven by a spindle motor 16 mounted on base 18. A slider 20 is movably supported relative to disc surface 12 via an actuator mechanism 22.

The slider 20 supports an SIL 24 for focusing a laser beam of an optical system on the disc surface for reading optically-encoded information. The actuator mechanism 22 preferably includes a voice coil motor 26. The slider 20 is coupled to the voice coil motor via a suspension assembly 28. The optical system includes an optical head 30 which preferably is coupled to the actuator mechanism 22 and operated thereby. The optical head 30 includes a laser beam which is focused onto the disc surface via the SIL 24 in a known manner for operation of the optical disc drive system.

Figure 2:
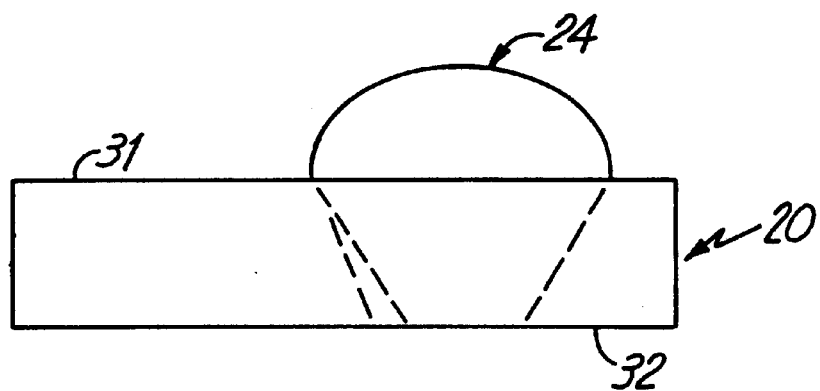
FIG. 2 is a plan view illustrating a slider carrying an SIL.

FIG. 2 illustrates the slider 20 and SIL 24 construction. Preferably, the slider is formed of a transparent material, such as a cubic zirconia. The SIL 24 is bonded to the slider 20 or, alternatively, the slider 20 and SIL 24 may be formed of an integral material machined from a single piece of crystal. For example, the integrated SIL 24 and slider 20 can be formed by injection molding a single piece of transparent material such as a commercially available polycarbonate in a known manner. The slider 20 includes an upper surface 31 and a lower air bearing surface 32 (surface not visible in FIG. 2) which is formed in a known manner to provide a hydrodynamic lifting force to the slider 20 and the lens 24 via rotation of optical disc 12 in a known manner.

Figure 3:
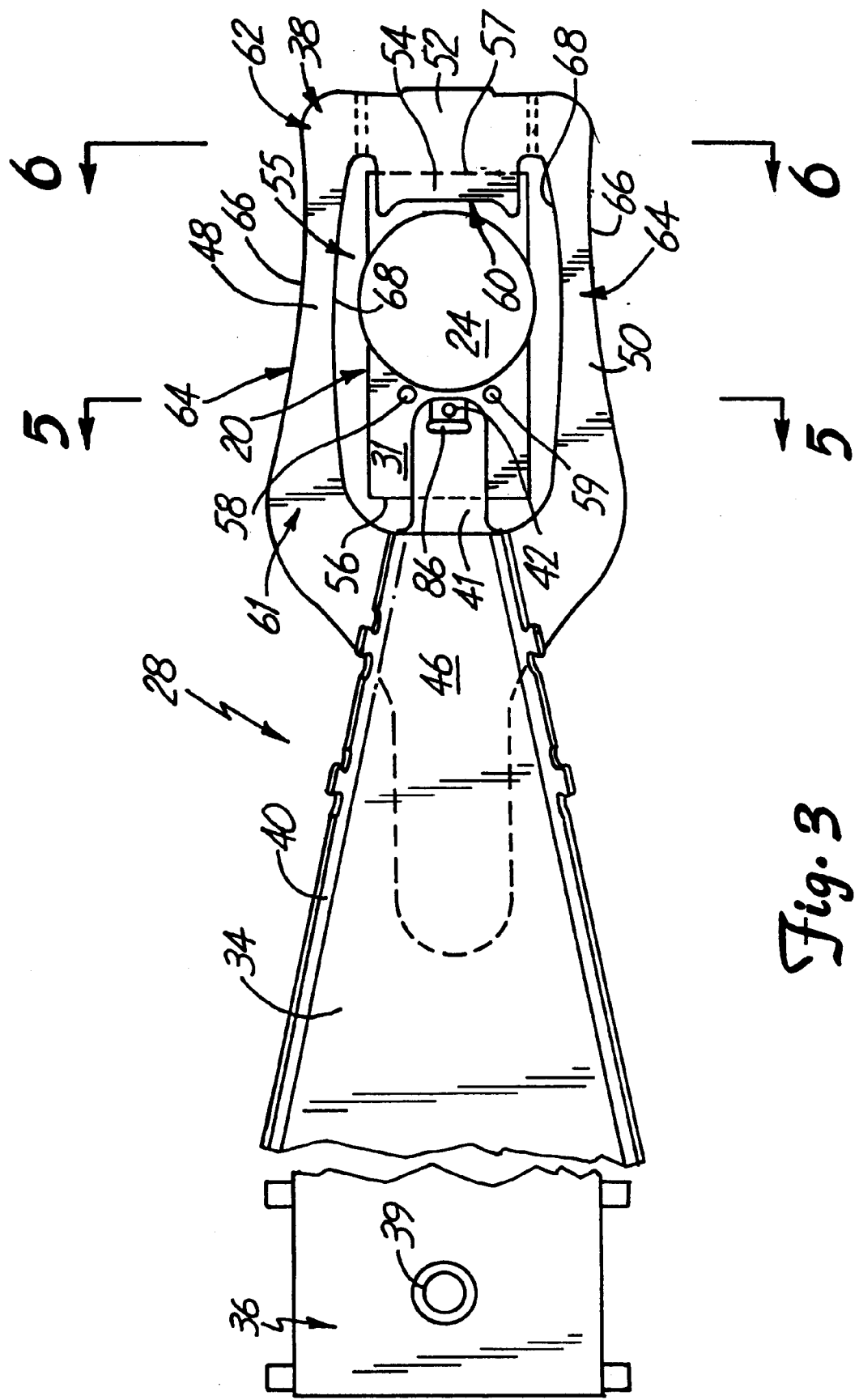
FIG. 3 is a top plan view of an embodiment of a suspension assembly of the present invention supporting a slider.

The slider 20 is supported by a suspension assembly 28 operably coupled to the actuator mechanism. In particular, as illustrated in FIG. 3, the suspension assembly includes a load beam 34, a mounting plate 36, and a gimbal spring 38. The mounting plate 36 is coupled to the actuator mechanism 22 via stake 39 in a known manner. Preferably, the load beam 34 is formed of an elongated flexible material which includes side rails 40 and a load tab 41 having load button 42 (on a lower surface of load tab 41) at an extended end of the load beam 34. Side rails 40 provide lateral and bending stiffness and a means for connecting wires to the slider 20.

The gimbal spring 38 is coupled to the load beam 34 and supports slider 20 relative to the load button 42. The slider is coupled to the gimbal spring 38 so that the load button 42 applies a load force to the upper surface 31 of the slider and also defines a gimbal pivot about which the slider 20 can pitch and roll relative to the disc surface. The lower air bearing surface 32 of the slider 20 (not shown) faces the disc surface so that rotation of disc 12 provides a hydrodynamic lifting force so that the slider 20 flies above the disc surface to read and write data to the disc surface. The load force counteracts the hydrodynamic lifting force to provide a consistent fly height for the slider 20 during operation of the disc drive. During operation of the disc drive, it is important to maintain a stable fly height for slider 20 close to the disc surface.

The gimbal spring of the suspension assembly allows the slider 20 to pitch and roll relative to the pivot point so that slider 20 can follow the topography of the disc surface. Although it is desirable to have slider 20 pitch and roll, it is desirable to maintain the in-plane, or lateral stiffness, to restrict lateral motion of the slider relative to the disc surface so that desired tracking may be accomplished. Accordingly, it is desirable to have a suspension assembly (including a gimbal spring 38) which restricts lateral movement of the slider.

During operation, the actuator mechanism 22 moves the suspension assembly to position the slider 20 and SIL 24 relative to selected positions on the disc surface. Since the suspension system is a mechanical system, the system has certain resonance frequency at which external motion or vibration is amplified. Thus, depending upon the construction of the suspension assembly including the slider 20, the frequency of the external forces may coincide with the resonance frequencies of the suspension system, causing the external motion to be amplified. Vibration of the suspension system corresponding to torsional mode resonance and sway mode resonance may interfere with accurate positioning of the slider 20 relative to the disc surface. Typical excitation forces are fairly low-frequency, less than 10,000 Hz. Thus, it is desirable to design a suspension assembly with an effective distribution of mass and stiffness to control the resonance vibration of the suspension system while providing desired in-plane stiffness and fly and operational characteristics.

The suspension assembly illustrated in FIG. 3 illustrates an embodiment of a gimbal spring 38 of the present invention for supporting slider 20. As shown, the gimbal spring 38 includes an elongated portion 46; flexure arms 48, 50; cross beam 52; and mounting tab 54. A portion of the elongated portion 46 defines a mounting portion for fixedly securing the gimbal spring 38 to a lower surface of the load beam 34. Arms 48, 50 extend from the elongated portion 46. Cross beam 52 is coupled to extended ends of arms 48, 50, and mounting tab 54 extends therefrom into gap 55 formed between spaced flexure arms 48, 50.

The slider includes a leading edge 56 and a trailing edge 57, and the distance between the leading edge and trailing edge defines the longitudinal extent of the slider. The longitudinal extent of the slider 20 is sufficient to accommodate SIL 24 and to provide a surface for mounting the gimbal spring 38 to the upper surface 31 of slider 20 and sufficient surface area to provide a contact surface for the load button 42 to exert a load force to the upper surface 31 of the slider 20 and accommodate wire termination pads 58, 59 for electrically connecting a magnetic transducer (not shown) for writing data to the disc surface for a magneto-optic system in a known manner. The SIL 24 is positioned toward the trailing edge 57 of the slider such that the dimension between the leading edge 56 and SIL 24 is greater than the longitudinal extent between the trailing edge 57 and the SIL 24. The extent between the leading edge 56 and SIL 24 is sufficient so that a load force can be applied toward the center of the slider 20 and so that sufficient surface area is provided to accommodate wire termination pads 58, 59.

Preferably, in the design of the gimbal spring 38 shown in FIG. 3, mounting tab 54 is aligned to couple to the trailing edge 57 of the slider. The mounting tab 54 is formed of a relatively short member extending from cross beam 52 to couple to the trailing edge of slider 20 along a relatively short longitudinal extent between the trailing edge 57 of the slider and the SIL 24. The mounting tab 54 is formed of a contoured face 60, which is designed to contour to the shape of lens 24. The contoured face 60 allows the mounting tab 54 to be positioned in close proximity to SIL 24 to maximize the bonding area while minimizing the length of the mounting tab 54; and, thus, the length of gimbal spring 38 (i.e. flexure arms 48, 50) that is required to accommodate mounting tab 54 is shortened.

As previously explained, slider 20 of the present invention is preferably designed so that the extent between the leading edge 56 and SIL 24 is sufficient so that when the gimbal spring 38 is coupled to load beam 34 and slider 20 is coupled to gimbal spring, there is sufficient length between the leading edge and SIL that the load button 42 can be located close to a center position of slider 20 and can allow for area for wire termination pads 58, 59. If there is not sufficient area, SIL 24 will restrict placement of the load button 42 toward the center of slider 20. Preferably, the load button 42 is formed by an etching process. The load button or dimple 42 formed by the etching process requires less surface area to form the dimple than traditionally formed dimples. Thus, the load button 42 formed by the etching process limits the surface area required for the load tab to provide ideal location of the load force relative to the slider 20 and provide sufficient surface area to mount the mounting tab 54 and wire termination pads 58, 59 relative to the upper surface 31 of the slider 20.

As shown, flexure arms 48, 50 are preferably formed of elongated members which extend in spaced alignment and include fixed ends 61 and extended ends 62. The fixed end 61 is coupled to the elongated portion 46 and is generally aligned toward the leading edge of the slider 20. The extended end 62 is spaced from the fixed end 61 at an opposed end of the elongated members and is generally positioned proximate to the trailing edge 57 of the slider 20. As previously explained, cross beams 52 is coupled between extended ends 62 of spaced flexure arms 48, 50 to support mounting tab 54 adhered to the trailing edge of the slider 20. As previously explained, in the design of the gimbal spring shown, the required extent between fixed end 61 and extended end 62 is minimized via the shortened mounting tab 54 since additional length is not required to accommodate a longer mounting tab 54.

The flexure arms 48, 50 are preferably formed of planar members having a generally uniform thickness along the length of the flexure arms 48, 50. In the embodiment of the gimbal spring 38 shown in FIG. 3, the flexure arms are designed to have a varied width along the extent of the arms 48, 50 between the fixed end 61 and the extended end 62. In particular, the width of the flexure arms 48, 50 is reduced at an intermediate portion 64 between the fixed and extended ends while sufficient width is provided at ends 61 and 62 to provide sufficient stiffness for the flexure arms 48, 50 to limit in-plane or other undesired motion.

The reduced width of the arms 48, 50 along the intermediate portion 64 reduces the mass of the flexure arms 48, 50 along an intermediate portion of the flexure arms 48, 50. The reduced mass along the intermediate portion 64 increases certain resonance frequency modes. In particular, in the design illustrated in FIG. 3, the reduced mass generally increases the torsional and bending resonance mode frequencies, although it may decrease the sway mode resonance. In the present invention, the mass is reduced along an intermediate portion 64 so as to increase the torsional and bending resonance mode frequencies to a more desired operation range. Although the reduced mass decreases the sway mode resonance frequency, the sway mode frequency of the reduced mass gimbal spring is acceptable, such that the sway mode resonance does not significantly interfere with placement of the SIL 24 or magnetic transducer elements at normal operation frequencies of the disc drive system. Thus, the design of the flexure arms provides a mass and stiffness distribution for optimizing the resonance vibration and stiffness characteristics of the suspension assembly.

Preferably, the reduced width portion is generally aligned proximate to a center position of the SIL 24 and distal of the position of the load button 42. Thus, the reduced width portion reduces the stiffness of the flexure arms 48, 50 at the intermediate position distal of the load button 42 to allow the slider 20 to pitch and roll relative to the load button 42 while providing sufficient stiffness at the ends of the flexure arms 48, 50 to limit out-of-plane movement and provide lateral stiffness.

Preferably, the fixed end 61 has a greater width then the extended end 62 to provide lateral stiffness at the connection of the gimbal spring 38 to load beam 34. Preferably, in the embodiment shown in FIG. 3, the flexure arms 48, 50 are tapered from the fixed end 61 toward the extended end 62 and are spaced a minimum distance apart relative to the width of the slider 20 and SIL 24 to provide stiffness to limit in-plane motion of the gimbal spring 38 and slider 20.

Preferably, as shown in the embodiment illustrated in FIG. 3, the arms 48, 50 are designed in an hourglass shape defined by an inwardly-curved outer edge 66 and an outwardly-curved inner edge 68. Thus, the inner and outer edges define a generally hourglass shape having an intermediate portion of reduced mass and end portions (i.e. fixed end and extended end) of sufficient width for desired stiffness. The contoured shape provides a mass and stiffness distribution for improved resonance vibration and stiffness characteristics.

Figure 4:
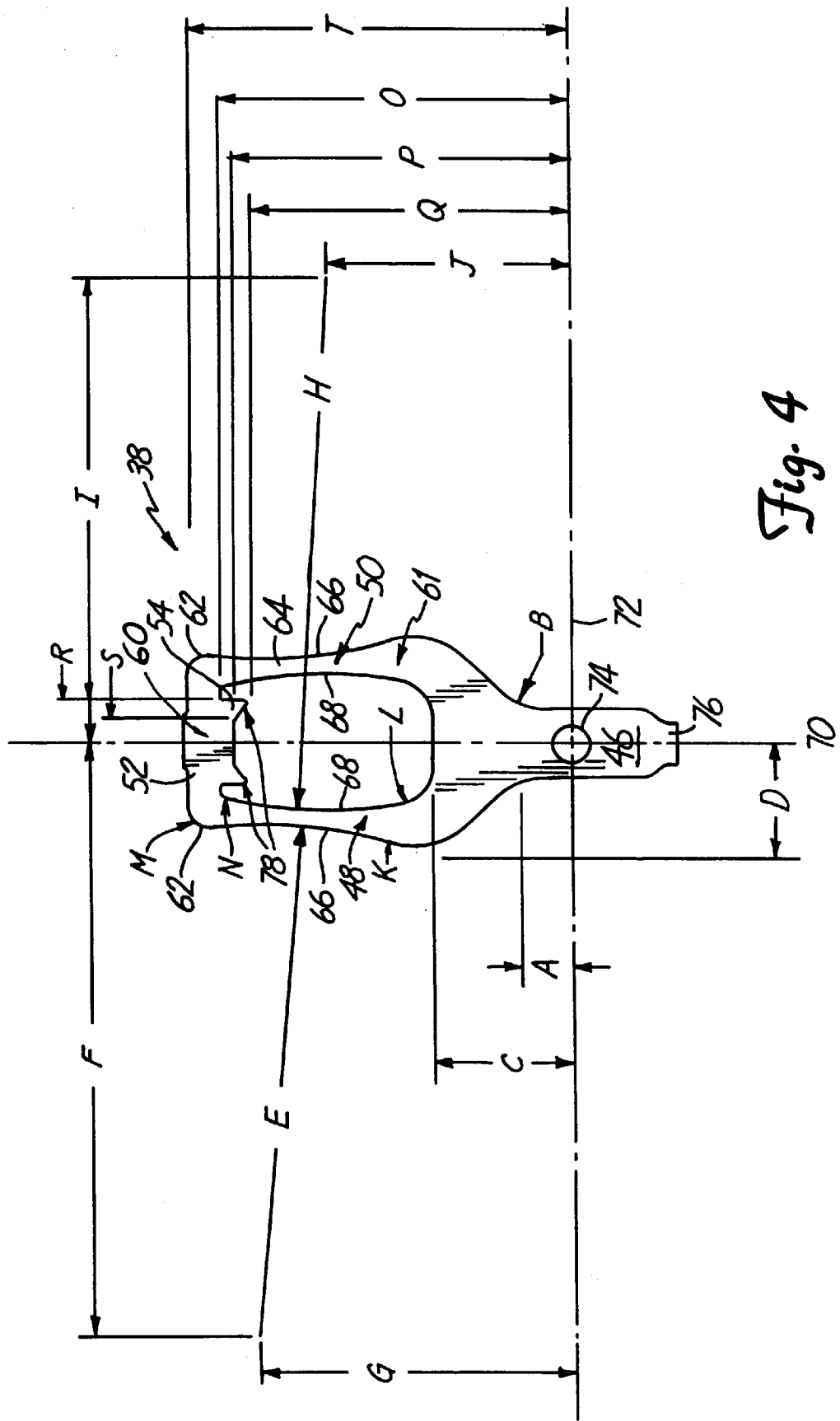
FIG. 4 is a top plan view of an embodiment of a gimbal spring of the present invention.

FIG. 4 is a plan view of gimbal spring 38 for illustrating the shape of a preferred embodiment of the gimbal spring 38 of the present invention. Dimensions are illustrated in reference to center line 70 and base line 72. Center line 70 divides the gimbal spring 38 in half and each half is a mirror image of the other. Base line 72 is referenced from a tooling hole 74 which is aligned relative to load beam 38 so that load button 42 is correctly aligned relative to slider 20 coupled to gimbal spring 38. As shown in FIG. 4, the elongated portion 46 is of uniform width from base line 72 along reference length A and then curves outwardly along arc B. The width of elongated portion 46 expands from extent A along extent C–A to a width defined by reference D from center line 72. Preferably, A is 0.0488 inches, B is a radius of 0.05 inches, C is 0.1312 inches and D is 0.1074 inches.

Flexure arms 48, 50 extend generally from elongated portion at reference C to extended ends 62. Arms 48, 50 are defined by inner and outer side edges 66, 68. Outer edge 66 includes an inwardly-curved portion defined by arc E located by reference dimension F from center line 70 and located by reference dimension G from base line 72. Inner edge 68 includes outwardly-curved portion defined by arc H located by reference dimension I from center line 70 and located by reference dimension J from base line 72. Preferably, E is a radius of 0.476 inches, F is approximately 0.554 inches and G is approximately 0.296 inches. Preferably, H is approximately a radius of 0.496 inches, I is approximately 0.433 inches and J is approximately 0.232 inches.

As shown in FIG. 4, fixed ends 61 of flexure arms 48, 50 include inner and outer curved edges defined by references K and L, respectively. Preferably, the radius of curvature for reference K is 0.075 inches and the radius of curvature for reference L is 0.035 inches. The extended ends 62 of flexure arms 48, 50 include inner and outer curved ends defined by references M and N, respectively. Preferably, the radius of curvature for reference M is 0.020 inches and the radius of curvature for reference N is 0.0050 inches.

As previously explained, preferably, the mounting tab 54 is formed of a relatively short longitudinal extent. The preferred dimensions for the longitudinal extent of the mounting tab 54 is shown in reference to base line 72 with respect to references O, P and Q. In particular, the extent between O–Q defines the longitudinal extent of the mounting tab 54 and the extent between references P–Q is the longitudinal extent of opposed side tabs 78 formed by the contoured face 60 of the mounting tab 54. Preferably, the dimensions for reference O is approximately 0.3321, reference P is 0.3182 inches and reference Q is 0.3017 inches.

The width of mounting tab 54 is provided by reference R relative to center line 70 and width of side tabs 78 is provided by reference R–S. Reference S is taken relative to center line 70. Preferably, reference R is approximately 0.0390 inches and reference S is 0.0225 inches. The length of the gimbal spring 38 is provided by reference T relative to base line 72 which is preferably 0.3631 inches. Preferably, gimbal spring 38 is formed of a planar member having a thickness of approximately 0.0015 inches and formed of a stainless steel material.

Figure 5:
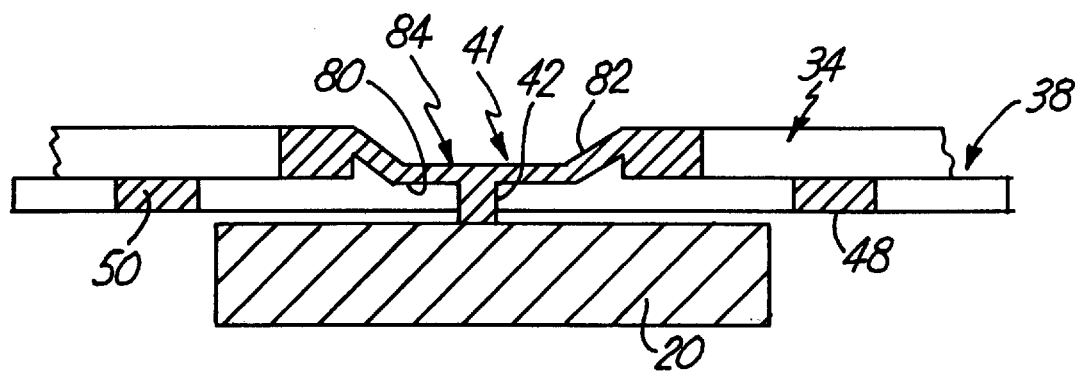
FIG. 5 is a cross-sectional view taken along line 5—5 of FIG. 3.

FIG. 5 is a cross-sectional view taken along line 5—5 of FIG. 3 and illustrates load button 42. As shown, the load button 42 is formed by an etching process as previously explained where material on a lower surface 80 of the load tab 41 is etched to form a dimple, and then an upper surface 82 of the load tab 41 is pressed to form recessed portion 84 and extended load button 42 by known manufacturing techniques. Opening 86 (shown in FIG. 3) facilitates press forming recessed portion 84 to form extended load button 42.

Figure 6:
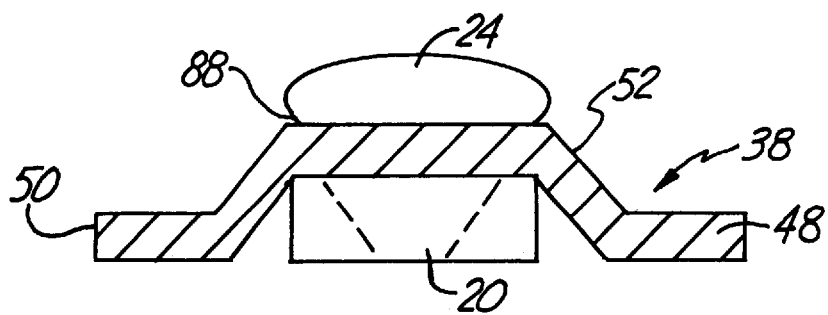
FIG. 6 is a cross-sectional view taken along line 6—6 of FIG. 3.

FIG. 6 is a cross-sectional view taken along line 6—6 of FIG. 3, illustrating cross beam 52. As shown, cross beam 52 is press-formed to form a raised portion 88 which is raised to lie in a plane above the plane of the flexure arms 48, 50 of the gimbal spring. This design allows the slider 20 to be coupled to the gimbal spring in a desired plane.

Although the present invention has been described with reference to preferred embodiments, workers skilled in the art will recognize that changes may be made in form and detail without departing from the spirit and scope of the invention. In particular, although the improved gimbal design has been described with reference to an optical disc system, use of the invention is not limited to an optical system, and the gimbal spring may be used to support a slider carrying conventional magnetic heads. Additionally, the gimbal spring of the present invention is not limited to the specific embodiment shown. For example, dimensions of the gimbal spring can be varied and the invention is not limited to varying the width of the flexure arms to achieve an intermediate reduced mass portion.

What is claimed is:

1. A head suspension assembly comprising:

a slider;

a load beam including a load tab having a load button;

opposed spaced gimbal arms separated to form a gap having a width wider than the slider, each gimbal arm including a leading edge portion, a trailing edge portion and an intermediate portion, the leading edge portion having a bulbous structure to provide lateral stiffness and the intermediate portion formed of a structure tapered from the leading and trailing edge portions to provide a center portion of reduced mass; and a dimpleless slider tab operably coupled to the trailing edge portions of the opposed gimbal arms to support the slider in the gap between the opposed gimbal arms wherein the slider includes a SIL supported between a leading edge and a trailing edge of the slider, and located toward the trailing edge, spaced from the leading edge of the slider so that the SIL is off-centered relative to the leading and trailing edges; wire termination pads on a portion of the slider between the leading edge and the SIL; and the load button aligned with a portion of the slider between the leading edge and the SIL; and the slider tab connected to a portion of the slider between the SIL and the trailing edge of the slider.

2. The suspension assembly of claim 1 wherein the load button is defined via a dimple etched from the load tab.

3. The device of claim 2 wherein the slider tab includes a face which is contoured to the shape of the SIL for placement of the slider tab in close proximity to the SIL.

4. The device of claim 3 wherein the slider tab includes a face which is contoured to the shape of the lens for placement of the slider tab in close proximity to the lens.

5. The device of claim 2 wherein the leading edge portions have a greater width than the trailing edge portions.

6. The device of claim 1 wherein the leading edge portion has a greater width than the trailing edge portion.

\* \* \* \* \*